United States Patent
Petersen et al.

(10) Patent No.: US 9,464,195 B2
(45) Date of Patent: Oct. 11, 2016

(54) SUPERAMPHIPHOBIC SURFACES BY ATMOSPHERIC PLASMA POLYMERIZATION

(71) Applicants: Julien Petersen, Spicheren (FR); Julien Bardon, Luxembourg (LU); Claude Becker, Zoufftgen (FR)

(72) Inventors: Julien Petersen, Spicheren (FR); Julien Bardon, Luxembourg (LU); Claude Becker, Zoufftgen (FR)

(73) Assignee: Centre de Recherche Public Henri Tudor, Luxembourg (LU)

( * ) Notice: Subject to any disclaimer, the term of this patent is extended or adjusted under 35 U.S.C. 154(b) by 60 days.

(21) Appl. No.: 14/449,902

(22) Filed: Aug. 1, 2014

(65) Prior Publication Data

US 2014/0342103 A1    Nov. 20, 2014

Related U.S. Application Data

(63) Continuation of application No. PCT/EP2013/052034, filed on Feb. 1, 2013.

(30) Foreign Application Priority Data

Feb. 2, 2012 (EP) .................................... 12153635

(51) Int. Cl.
| | |
|---|---|
| *C09D 5/00* | (2006.01) |
| *B05D 5/08* | (2006.01) |
| *B05D 7/00* | (2006.01) |
| *B05D 1/00* | (2006.01) |
| *B05D 1/08* | (2006.01) |

(52) U.S. Cl.
CPC . *C09D 5/00* (2013.01); *B05D 1/08* (2013.01); *B05D 1/62* (2013.01); *B05D 5/083* (2013.01); *B05D 7/50* (2013.01)

(58) Field of Classification Search
None
See application file for complete search history.

(56) References Cited

U.S. PATENT DOCUMENTS

| | | | |
|---|---|---|---|
| 2004/0022945 A1* | 2/2004 | Goodwin | B05B 5/00 427/255.27 |
| 2006/0118242 A1* | 6/2006 | Herbert | C23C 16/5096 156/345.43 |
| 2007/0093076 A1 | 4/2007 | Mikhael et al. | |
| 2008/0166884 A1* | 7/2008 | Nelson | C23C 16/45517 438/765 |
| 2012/0051018 A1* | 3/2012 | Ollgaard | B05D 1/62 361/781 |

FOREIGN PATENT DOCUMENTS

| | | |
|---|---|---|
| WO | WO 2006/036461 A1 | 4/2006 |
| WO | WO 2006/049794 A2 | 5/2006 |

* cited by examiner

*Primary Examiner* — Joseph Miller, Jr.
(74) *Attorney, Agent, or Firm* — Reinhart Boerner Van Deuren P.C.

(57) ABSTRACT

The present invention relates to a method for producing a superamphiphobic coating on a substrate, said method comprising the steps of a) providing a substrate, b) generating a plasma in a treatment space, under atmospheric pressure, using a dielectric barrier discharge, by supplying a plasma gas (6) between at least a first and a second electrode (2 and 3) connected to alternating current (AC) power means (7), said electrodes (2 and 3) defining said treatment space (5), c) introducing into said plasma a coating forming material selected from the group consisting in fluoro-acrylate monomers, fluoro-alkyl acrylatemonomers, fluoro-methacrylate monomers, fluoro-alkyl methacrylatemonomers, fluoro-silane, monomers or a combination thereof, d) exposing at least a part of the surface of said substrate to said plasma comprising said coating forming material in multiple successive passes within said treatment space by moving said substrate, said at least first and/or second electrode (2, 3), or both, without stopping, from one pass to another, the generation of the plasma and said introduction of said coating forming material into said plasma.

20 Claims, 9 Drawing Sheets

SUPERAMPHIPHOBIC SURFACES BY ATMOSPHERIC PLASMA POLYMERIZATION

CROSS-REFERENCE TO RELATED PATENT APPLICATIONS

This patent application is a continuation of PCT/EP2013/052034, filed Feb. 1, 2013, which claims priority to European Application No. 12153635.3, filed Feb. 2, 2012, the entire teachings and disclosure of which are incorporated herein by reference thereto.

FIELD OF THE INVENTION

The present invention relates to a method for producing a superamphiphobic coating on a substrate and to such a superamphiphobic coating.

PRIOR ART AND RELATED TECHNICAL BACKGROUND

Surfaces with high repellency for water are considered as being superhydrophobic and surfaces with high repellency for oil as being superoleophobic.

Superamphiphobic surfaces are surface having both water and oil repellent behaviour. Such surfaces simultaneously show superhydrophobic and superoleophobic properties.

Numerous studies have shown that some biological species have surfaces with superhydrophobic properties such as for example mosquito's eyes, water strider and lotus leafs.

Attempts have been made to achieve biomimetic materials with superhydrophobic properties, but few of these materials have superoleophobic properties.

Liquid repellent surfaces can be produced by lowering the surface energy of a surface and controlling the roughness of the materials.

Numerous methods have been widely reported in the last decade to process superhydrophobic surfaces by various chemical or physical approaches.

Superhydrophobic surfaces may be prepared from amorphous carbon (a-C) films as described for example by Ying Zhou et al. in Colloids and Surfaces A: Physicochemical and Engineering Aspects volume 335 (2009) pages 128 to 132, from nanotubes as described for example by Sunny Sethi et al. in Langmuir 2009, volume 25(8), pages 4311 to 4313, from Silica particles as described for example by Xing Yi Ling et al. in Langmuir, 2009, volume 25 (5), pages 3260 to 3263, or from ZnO nanorods as described for example by Min Guo et al. in Thin Solid Films, volume 515 (2007) pages 7162 to 7166.

Furthermore, hybrid organic/inorganic composites have also been investigated on the basis of sol-gel-derived titania or alumina/dodecylamine as described in Bai J. Bharathi et al. in Applied Surface Science volume 255 (2009) pages 4479 to 4483, or by embedding hydrophobically modified fumed silica (HMFS) particles in polyvinylidene fluoride (PVDF) matrix as described by V. V. Vinogradov et al. in The Journal of Sol-Gel Science and Technology (2010) volume 53 pages 312 to 315.

Fluorinated functional composites or fluorinated polymers coatings have been deposited on a wide range of custom-made micro/nanostructures using a replication template as described for example by Woo Lee et al. in Langmuir, 2004, volume 20 (18), pages 7665 to 7669.

These studies generally relate to hybrid preparation methods comprising two distinctive steps, such as for example a colloidal lithography as described for example by Yunfeng Li et al. in Langmuir (2010), volume 26 (12), pages 9842 to 9847, followed by initiated chemical vapor deposition as described for example by J. Nathan et al. in Chemistry of Materials 2009, volume 21, pages 742 to 750, or by using silicon nanowires via electroless etching step followed by fluorine carbon coatings as described for example by Beom Seok Kim et al. in Langmuir, volume 27 (16), pages 10148 to 10156.

Another hybrid method has been described by C. Becker et al. in Journal of Physical Chemistry C, 2011, volume 115 (21), pages 10675 to 10681, comprising a laser irradiation and a magnetron deposition of a fluoropolymer thin film.

However, numerous studies have shown difficulties to achieve superhydrophobic coatings by a single step method.

Nanostructured superhydrophobic surfaces have been described by E. Martines et al. in Nano Letters, volume 5 (10) pages 2097 to 2103, by K. Lau et al. in Nano Letters, volume 3 page 1701 (2003) and S. M. M. Ramos et al. in Journal of Applied Physics (2009) volume 106 page 024305.

However, the conditions allegedly required for obtaining such nanostructured surfaces with high contact angle values and low water contact angle hysteresis (WCAH) are very restrictive.

Furthermore, such superhydrophobic surfaces could not be considered as superamphiphobic surfaces as they have only limited superoleophobic properties.

Other attempts were made using $SiO_2$ nanoparticles (Zhoukun He et al. in Soft Matter, 2011, volume 7, pages 6435 to 6443) or carbon nanotubes (Huanjun Li et al. Angewandte Chemie International Edition 2001, volume 40 (9), pages 1743 to 1746) by electrochemistry from metallic samples in perfluorocarboxylate based electrolytes (Haifeng Meng at al. in Journal of Physical Chemistry C, 2008, volume 112 (30), pages 11454 to 11458) or by electrospinning of fluoro compounds fibers (Gyoung-Rin Choi et al. in Macromolecular Materials and Engineering, 2010, volume 295, pages 995 to 1002) or by anisotropic etching of silicon coated with a thin hydrophobic layer (Ramasamy Thangavelu Rajendra Kumar at al. in Journal of Physical Chemistry C, 2010, volume 114 (7), pages 2936 to 2940).

Low surface energy fluorocarbon polymer coatings have been prepared, as disclosed by Virendra Kumar et al. in Plasma Processes and Polymers, 2010, volume 7, pages 926 to 938, via plasma enhanced chemical vapor deposition (PECVD) of 1H,1H,2H,2H-perfluorodecyl acrylate (PFDA) in a low pressure inductively excited RF plasma, by initiated chemical vapor deposition as described by Malancha Gupta et al. in Langmuir 2006, volume 22, pages 10047 to 10052, or in corona discharge using 1H,1H,2H,2H-Heptadecafluorodecyl acrylate (HDFDA) as disclosed by P. Anthony et al. in chemistry of materials, 2009, 21, pages 4401 to 4403.

The plasma polymerized PFDA coating thus obtained showed good chemical characteristics, however its water contact angle (WCA) is low, i.e. around 120°. It is assumed that a low roughness achieved by these deposition methods triggers this low WCA.

Furthermore, L. Laguardia et al. in Macromolecular Symposia 2007, volume 247, pages 295 to 302 discloses the deposition of a fluorocarbon film, using 1H, 1H, 2H-perfluoro-1-dodecene as monomer, in a continuous radio frequency (RF) glow discharge. The water- and oil-repellent coating thus obtained has a relatively high contact angle for water of 134° and 116° for di-iodomethane with an average roughness (Ra) of 2.8 nm.

Xuyan Liu et al. discloses in Applied Surface Science, volume 257 (2011), pages 8828 to 8835, the modification of the surface of polyvinylidene fluoride (PVDF) film by a RF atmospheric plasma treatment using argon as carrier gas to obtain a film having amphiphobic properties.

However, none of these coatings combine both superhydrophobic and superoleophobic properties, as such, for example, of having apparent contact angle (CA) above 150° for water and oil.

AIMS OF THE INVENTION

The present invention aims to provide a method for producing a superamphiphobic coating and to such coating having improved properties over the prior art.

The present invention further aims to provide a method which is an alternative to traditional methods for producing a superhydrophobic coating or a superamphiphobic coating.

The present invention also aims to provide a superamphiphobic coating with water and oil repellent properties for a wide variety of substrates.

SUMMARY OF THE INVENTION

The present invention relates to a method for producing a superamphiphobic coating on a substrate, the method comprising the steps of a) providing a substrate, b) generating a plasma in a treatment space, under atmospheric pressure, using a dielectric barrier discharge, by supplying a plasma gas between at least a first and a second electrode connected to alternating current (AC) power means, said electrodes defining said treatment space, c) introducing into said plasma a coating forming material selected from the group consisting in fluoro-acrylate monomers, fluoro-alkyl acrylate monomers, fluoro-methacrylate monomers, fluoro-alkyl methacrylate monomers, fluoro-silane, monomers or a combination thereof, d) exposing at least a part of the surface of said substrate to said plasma comprising said coating forming material in multiple successive passes within said treatment space by moving said substrate and/or said at least first and/or second electrode, without stopping, from one pass to another, the generation of the plasma and said introduction of said coating forming material into said plasma.

According to particular embodiments, the method may comprise one, or a combination, of any of the following characteristics:
- the movement of the at least first and second electrodes and/or the substrate is a translational or a rotational movement,
- the coating forming material comprises a monomer, or monomers, having the formula:

wherein $R_1$, $R_2$, independently of one another are hydrogen, fluorine, a fluoro-alkyl ($C_1$-$C_4$) or $CF_3$, n is comprised between 3 to 30, $R_3$, $R_4$, independently of one another and independently of $R_1$ and $R_2$, are hydrogen, an alkyl($C_1$-$C_4$), an hydroxyl, m is 1 or 2 or 3, X is O—CO—$CR_5$=$CHR_6$ wherein $R_5$ and $R_6$, independently of $R_1$, $R_2$, $R_3$ and $R_4$, are hydrogen or a methyl group, or X is —Y—Si—$(R_7)_3$, wherein Y is oxygen or nothing, and $R_7$, independently of $R_1$, $R_2$, $R_3$, and $R_4$, is an alkoxy group
- the coating forming material is introduced into the plasma gas either in a liquid form or in a vaporized form,
- the coating forming material is introduced into the plasma gas at a mass flow comprised between 0.001 and log per liter of plasma gas,
- the coating is deposited over the substrate surface at a deposition rate comprised between 10 to 500 nm/min,
- the plasma is generated with a power density comprised between 0.05 and 10 W·cm$^{-2}$,
- the superamphiphobic coating has a contact angle of at least 150° for water and 130° for hexadecane and a roughness (Sa) comprised between 50 nm and 300 nm.

The present invention relates also to a substrate coated with the coating according to the invention.

DETAILED DESCRIPTION OF THE INVENTION

According to the present invention a coating is produced on all or a part of the surface of a substrate (or support) by the polymerization of a coating forming material using an atmospheric plasma discharge.

"Atmospheric plasma" is to be understood as being a plasma generated under atmospheric pressure, under a pressure substantially equal or equivalent to atmospheric pressure, with no reduction of pressure, i.e. no use of any vacuum.

Figure 1:
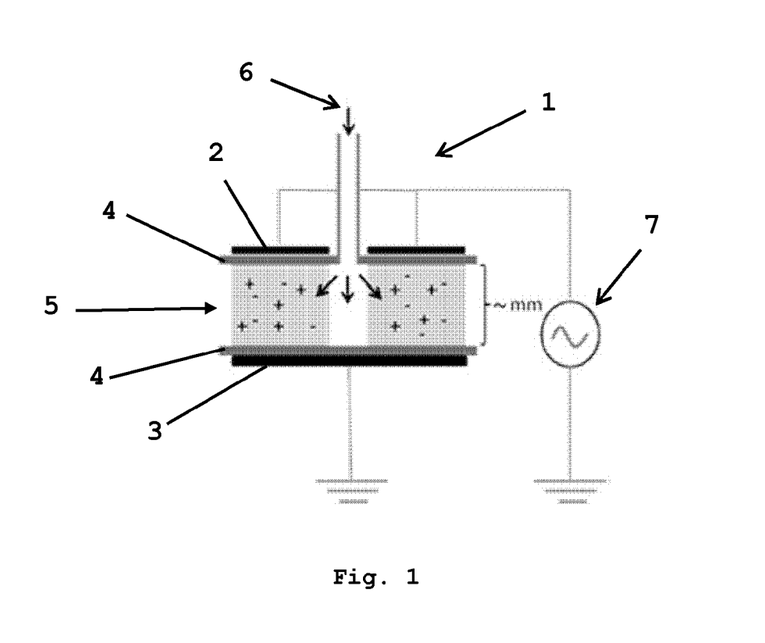
FIG. 1 is a schematic representation of an embodiment of an atmospheric pressure plasma dielectric barrier discharge reactor.

A plasma reactor 1, in a dielectric barrier discharge (DBD) configuration, comprises, at a pressure substantially equal or equivalent to atmospheric pressure, at least a first electrode 2 and a second electrode 3, separated by an insulating dielectric barrier 4. Alternatively, a plurality of electrodes is provided. The at least first and second electrodes 2 and 3, or plurality of electrodes, define a treatment space 5, or process space, in which a substrate is provided.

The plasma reactor 1 according to the invention does not comprise a plurality of enclosures or chambers provided in series. It comprises a unique treatment space 5 defined by the at least a first and second electrodes 2 and 3, the treatment space 5 having dimensions in relation to the dimensions of the substrate to be treated. Preferably, the height of the treatment space 5 is of between 0.1 and 10 mm.

An embodiment of the plasma reactor 1 is represented at FIG. 1 having the electrodes 2 and 3 in a plane-plane configuration. However, different reactor configurations are possible. One or both of the electrodes 2 and 3 may be cylindrical, or may have a wire-plane configuration, or may be in a point-plane configuration.

The plasma reactor 1 further comprises power means connected to the electrodes 2 and 3, alternating current (AC) power means 7, to providing a high voltage alternating current (AC) to expose the substrate within the treatment space 5 to a DBD discharge generated between said first and second or plurality of electrodes 2 and 3.

The plasma generated in the dielectric-barrier discharge is considered as being a "cold" plasma, as the temperature recorded with the plasma or on adjacent surface are below 100° C. Preferably, the discharge is performed at room temperature.

The power density over the electrodes 2 and 3 is preferably comprised between 0.05 and 10 W·cm$^{-2}$. The plasma is generated by an alternating current (AC) voltage whose frequency is comprised between 0.1 and 3000 kHz.

Preferably, the plasma is generated with a power density over the electrodes 2 and 3 of 0.33 W·cm$^{-2}$, the AC power been set to apply 10 kV between the electrodes 2 and 3 and its frequency being set at 6 kHz.

The plasma may be generated continuously, or in a pulsed mode comprising one or a plurality of cycles comprising a period of time wherein the plasma is generated and a period of time wherein the plasma is not generated. In a preferred embodiment, the plasma is generated in pulsed mode by using a pulsed AC generator.

In the treatment space 5, a plasma gas 6 is provided, said plasma gas comprising a coating forming material. Therefore, the plasma reactor 1 further comprises means to transport the plasma gas 6 between the electrodes 2 and 3, and possibly comprises an aerosol generator or a vapor generator.

In the embodiment shown in FIG. 1, the plasma gas 6 is preferably injected centrally through an opening in the electrode 2.

Preferably, the dielectric barrier materials 4 is made of glass, quartz, ceramics or polymer—materials of low dielectric loss and high breakdown strength polymers.

The plasma gas 6 is a plasma generating gas, preferably an inert gas, preferably either helium (He) or argon (Ar), or a combination of helium (He) and argon (Ar).

The plasma gas 6, or gases, do not comprise any further gas, for example stabilisation gas or reactive gas, in particular, neither nitrogen, nor oxygen, but may nevertheless comprise-s the normal impurities comprised in pure He or Ar gas grades, in usual amounts in such grades.

The impurities coming from the atmosphere are reduced, or kept to an undetectable level, using a high flow of process gas, usually from 5 to 100 slm (standard liter per minute) which corresponds to residence time in the process space 5 between 0.03 and 7.5 s.

The coating forming material advantageously is a fluoro precursor and comprises a polymerisable monomer or a combination of polymerisable monomers. Preferably, the coating forming material comprises a fluoro acrylate, a fluoro-alkyl acrylate, a fluoro methacrylate, fluoro-alkyl methacrylate, fluorosilane or a combination thereof.

Preferably, the polymerisable monomer or monomers have the following formula:

$CFR_1R_2—(CF_2)_n—(CR_3R_4)_m—X$ wherein $R_1$, $R_2$, independently of one another are hydrogen, fluorine, a fluoro-alkyl ($C_1$-$C_4$) or $CF_3$, n is comprised between 3 to 30, $R_3$, $R_4$, independently of one another and independently of $R_1$ and $R_2$, are hydrogen, an alkyl($C_1$-$C_4$), an hydroxyl, m is 1 or 2 or 3, X is O—CO—$CR_5$=$CHR_6$ wherein $R_5$ and $R_6$, independently of $R_1$, $R_2$, $R_3$ and $R_4$, are hydrogen or a methyl group, or X is —Y—Si—$(R_7)_3$, wherein Y is oxygen or nothing, and $R_7$, independently of $R_1$, $R_2$, $R_3$, and $R_4$, is an alkoxy group.

In a preferred embodiment, the polymerisable monomer or monomers are selected from the group consisting of 1H,1H-perfluorohexyl acrylate, 1H,1H,5H-octafluoropentyl acrylate, 1H,1H-perfluoroheptyl acrylate, 1H,1H,7H-perfluoroheptyl acrylate, 1H,1H-Perfluorooctyl acrylate, 1H,1H-perfluorodecyl acrylate, 1H,1H-perfluorododecyl acrylate, 1H,1H,11H-perfluoroundecyl acrylate, 1H,1H,2H,2H-nonafluorohexyl acrylate, 1H,1H,2H,2H-perfluoro-7-methyloctyl acrylate, 1H,1H,2H,2H-perfluorooctyl acrylate, 2-(Perfluoro-7-methyloctyl)ethyl acrylate, 1H,1H,2H,2H-perfluorodecyl acrylate, 1H,1H,2H,2H-perfluorodecyl acrylate, eicosafluoro-11-(trifluoromethyl) dodecyl acrylate, 1H,1H,2H,2H-perfluorododecyl acrylate, 1H,1H,2H,2H-perfluorododecyl acrylate, 3-(Perfluoro-3-methylbutyl)-2-hydroxypropyl methacrylate, 3-(Perfluoro-5-methylhexyl)-2-hydroxypropyl methacrylate, 1H,1H-perfluorohexyl methacrylate, 1H,1H,5H-octafluoropentyl methacrylate, 1H,1H-perfluoroheptyl methacrylate, 1H,1H,7H-perfluoroheptyl methacrylate, 1H,1H-perfluorodecyl methacrylate, 1H,1H-perfluorododecyl methacrylate, 1H,1H,11H-perfluoroundecyl methacrylate, 1H,1H,2H,2H-nonafluorohexyl methacrylate, 1H,1H,2H,2H-perfluoro-7-methyloctyl methacrylate, 1H,1H,2H,2H-perfluorooctyl methacrylate, 2-(Perfluoro-7-methyloctyl)ethyl methacrylate, 1H,1H,2H,2H-perfluorodecyl methacrylate, 1H,1H,2H,2H-perfluorodecyl methacrylate, eicosafluoro-11-(trifluoromethyl) dodecyl methacrylate, 1H,1H,2H,2H-perfluorododecyl methacrylate, 1H,1H,2H,2H-perfluorododecyl methacrylate, 3-(Perfluoro-3-methylbutyl)-2-hydroxypropyl methacrylate, 3-(Perfluoro-5-methylhexyl)-2-hydroxypropyl methacrylate, di-isopropyl(1H,1H,2H,2H-perfluorodecyl)silane, 1H,1H,2H,2H-perfluoro-octyltriethoxysilane, trichloro (1H,1H,2H,2H-perfluorooctyl)silane, 1H,1H,2H,2H-perfluorooctyltrimetoxysilane,3,3,3-trifluoropropyl tri methoxysilane, (perfluoroalkyl)ethyl-triethoxysilane, nonafluorohexyl-triethoxysilane, bis(trifluoropropyl)tetramethyl disiloxane.

The coating forming material is introduced into the plasma gas 6 either in a liquid form, atomized or nebulized, or in a vaporized form. Preferably, the coating forming material is introduced in the form of an aerosol.

If, before being introduced in the plasma gas 6, the coating forming material is not in a liquid or gas form at room temperature, it has to be transformed in a liquid or a gas before being introduced in the plasma gas.

The coating forming material may be introduced into the plasma gas 6 continuously or discontinuously.

Preferably, the coating forming material is introduced in the plasma gas 6 at a mass flow comprised between 0.001 and 1og per liter of process gas.

The method according to the invention is performed in dynamic conditions, wherein at least a part of the surface of the substrate is exposed, treated, a first time to the plasma comprising the coating forming material, and the treated part of the substrate is exposed to the plasma comprising the coating forming material at least a second time, preferably many times, within the treatment space 5.

In a first preferred embodiment, the substrate, or part of the substrate, is exposed to, treated by, the plasma within the same treatment space 5 by generating a plasma using a pulsed mode comprising one or a plurality of cycles comprising a period of time wherein the plasma is generated and a period of time wherein the plasma is not generated. Preferably, the plasma is generated in pulsed mode by using a pulsed AC generator.

In another preferred embodiment, the substrate, or part of the substrate, is exposed to, treated by, the plasma within the same treatment space 5 in multiple successive passes, or movements, without stopping the generating of the plasma and said introduction of said coating forming material into said plasma.

The multiple successive passes are achieved by moving the substrate, the at least first and/or second electrode 2 and 3, or both. Preferably, the at least one electrode 2 or 3, preferably both electrodes 2 and 3, or the substrate, or the at least one electrode 2 or 3 and the substrate are moved independently one from the other. They are moved according to different directions and/or with different velocities and/or while one electrode is stopped and the other is moved and/or while the substrate is stopped and the electrode(s) is (are) moved and vice versa.

The relative movement of the at least one electrode 2 or 3 and/or the substrate may be a lateral or translational displacement, a rotational displacement, a vertical displacement, or a combination thereof.

The translational movement of the at least one electrode 2 or 3, preferably of the two electrodes 2 and 3, and of the substrate, corresponds to a displacement along a direction parallel to the substrate or parallel to the electrodes 2 and 3 respectively. The multiple successive passes correspond to at least one back and forth movement, preferably a plurality of movements, within the treatment space 5.

The rotational movement of the at least one electrode 2 or 3, preferably of the two electrodes 2 and 3 and of the substrate, corresponds to a displacement around an axis perpendicular to the substrate or to the electrodes 2 and 3. The multiple successive passes correspond to at least a 180 degree rotation of the substrate to expose a firstly treated part several times.

The vertical displacement of the at least one electrode 2 or 3, preferably of the two electrodes 2 and 3 and of the substrate, corresponds to a displacement along a direction perpendicular to the substrate surface or to the electrodes 2 and 3. The multiple successive passes correspond to at least one up and down movement, preferably a plurality of movements, within the treatment space 5.

The multiple successive passes may comprise three dimensional movements, i.e. successive or concomitant translational, rotational and vertical movements, but in a preferred embodiments, the multiple successive passes comprise translational or rotational movements. In these embodiments, the distance between the substrate and the first electrode 2 and the distance between the substrate and the second electrode 3, are substantially constant, i.e. there is no, or limited, vertical movements of the substrate in respect to the electrodes 2 and 3 or of the electrodes 2 and 3 in respect to the substrate.

In embodiments comprising lateral or rotational movements, the number of passes is preferably of at least 10 movements, one movement being a back and forth movement for a lateral movement or a rotation of 180 degrees for a rotational movement, which corresponds to at least 60 seconds of treatment.

The coating may be formed over all, or only a part, of the substrate surface in a plurality of layers of polymer. The coating thus obtained may have a roughness (Sa, 3D arithmetic mean height) comprised between 50 and 300 nm, more preferably between 100 and 250 nm.

The relative movements of the least one electrode 2 or 3 and/or of the substrate is preferably performed at a relative speed comprised between 0.1 and 400 m·min$^{-1}$.

The deposition rate decreases as the monomer flow increases for a given power and process flow and varies from around 100 nm/min at low W/F to around 10 or 20 nm/min at high W/F.

The dynamic deposition conditions present the advantages of providing a better coating microstructure and topography, i.e. more homogeneous, and thus better superhydrophobic and superoleophobic properties.

Furthermore, the method according to the invention presents the advantage of being a one step process. No curing step, or further curing step, has to be carried out. No additional or post-treatment is necessary to control the roughness and/or the surface chemical composition. In addition, the method has the advantage of being able to be used on a wide range of substrates.

The coating obtained with the method according to the invention presents a surprising morphology. It comprises a regular morphology of nano-sized globular structures which are homogeneous. It comprises globular structures with little heterogeneity, forming thus an homogenous topography.

The minimum roughness (Sa) obtained for the coating according to the invention is of at least 100 nm.

The coating obtained with the method according to the invention surprisingly presents improved superhydrophobic and superoleophobic properties. It comprises a contact angle of at least 170° for water and 150° for hexadecane, while in static conditions (reference control wherein the substrate and the electrodes 2 and 3 are not moved) the contact angle is 155° for water and 139° for hexane.

The coating according to the invention may be used as a water and oil repellent surface, a fluid motion control surface, preferably in microfluidics, an anti-icing surface, an anti-sticking surface, an anti-fogging surface or a self-cleaning surface.

The substrate which may be coated using the method according to the invention does not require to have a flat surface and may have various forms and shapes. For example, the substrate to be coated may be a plastic film, non-woven materials, metal foils or plates, ceramic or composite foils or plates.

The substrate coated with the coating obtained according to the invention have thus water and oil repellent properties, fluid motion control, anti-icing, anti-sticking, anti-fogging or self-cleaning properties.

Example

A dielectric barrier discharge is generated between an earthed bottom aluminium plate and two high-voltage aluminium top plates with a surface of 300 cm$^2$ separated by a silicate dielectric barrier. The gap between the electrodes is set at around 2 mm. The plasma discharges is generated continuously by an AC power supply. The frequency is set to 6 kHz and the voltage is a sinusoid as a function of time. Electrical discharge value is 10 kV which corresponds to a power density over the electrodes of 0.33 W·cm$^{-2}$. A substrate, i.e. a silicon wafer, is positioned on the bottom electrode. The precursor, 20 ml of a PFDA (1H, 1H, 2H, 2H-Perfluorodecyl acrylate monomer) solution from Sigma-Aldrich, is atomized in a TSI 3076 device at a flow rate of around 3 g·min$^{-1}$. Helium gas is used as plasma gas at a flow of around 10 slm (standard liter per minute). The gas mixture containing the precursor aerosol is injected into the plasma through a slit between the two top electrodes. The deposition is carried out at atmospheric pressure and at room temperature.

In the static conditions, the polymerisation is performed while the electrodes or the substrate are not moved.

In the dynamic conditions, the top electrode block moved laterally back and forth over the substrate at a relative speed of around 4 m·min$^{-1}$.

The coating chemical structure and molecular information have been determined by Fourier transform infrared spectroscopy (FTIR) in transmission mode with a Bruker Optics Tensor 27 spectrometer, and by matrix assisted laser desorption ionization (MALDI-TOF-MS) analyses respectively.

MALDI-TOF mass spectra were recorded using a Bruker Autoflex III mass spectrometer (Bruker Daltonics, Leipzig, Germany) equipped with Nd-YAG laser ($\lambda$=355 nm, pulse duration 5 ns, output energy 100 mJ per pulse, repetition rate 200 Hz). Positive ion mass spectra are acquired in reflectron mode by summing 1 000 laser shots.

The samples are prepared according to the so-called "dried droplet" method, using 2,5-dihydroxybenzoic acid (2,5-DHB) as the matrix and Na-TFA (trifluoroacetic acid) as ionization salt. The pp-PFDA film is immersed in a Hexafluoroisopropanol (HFIP) solution. The fraction of pp-PFDA dissolved in HFIP is around 70 wt.-%. Typically, 10 mL of the sample solution are mixed with 10 mL of a solution of DHB (15 g·L$^{-1}$ in THF). Then, 1 µL of this mixture is deposited on the MALDI target and allowed to air dry.

The influence of the deposition parameters such as plasma power density, precursor flow rate, gas carrier flow rate and the deposition time on chemical surface composition and micro/nanostructure morphology of the plasma polymer layer are investigated by X-ray photoelectron spectroscopy (XPS) and AFM (PicoSPM LE from Scientec company) respectively.

XPS analysis (Hemispherical Energy Analyzer SPECS, PHOIBOS 150) are performed with a monochromatic Al K radiation operating at 200 W with an anode voltage of 16 kV. The pressure in the analysis chamber is around 10$^{-9}$ mbar. The XPS spectra are referenced with respect to the C1s peak at 284.6 eV originating from carbon contamination. Core peaks are analyzed using a nonlinear Shirley-type background and fitted using 70% Gaussian, 30% Lorentzian lineshapes.

For AFM imaging, samples are dried under Ar, and imaged with silicium nitride cantilevers (Park Scientific) in tapping mode.

The structure of the coating obtained in static conditions (reference control) or in dynamic conditions according to the example are investigated by ESEM analyses.

The coating thickness is determined by means of single wavelength ellipsometry (PZ 2000, Jobin Yvon, France) at an angle of incidence of 70°. The coatings are considered to be homogeneous with constant refractive index of 1.365 at 632.8 nm. The thickness values are calculated by adjusting a Fresnel model to the measured y and A values.

Water and hexadecane contact angles are measured on an OCA 15+ contact angle measuring instrument from Dataphysics, equipped with a CCD camera. Water and hexadecane contact angles are measured with a 4 µL deionized water droplet deposited on the samples surfaces to evaluate the superhydrophobicity and superoleophobicity respectively by quantitavely measuring the angle formed by the liquid and the surface. Water contact angle hysteresis (WCAH) is evaluated by the advancing and receding mode and determined automatically during the volume growth and shrinkage of the distilled water droplet of distilled water. Three measurements are made on each surface. WCAH, which is equal to the difference between advancing and receding contact angle, is then determined.

Figure 2:
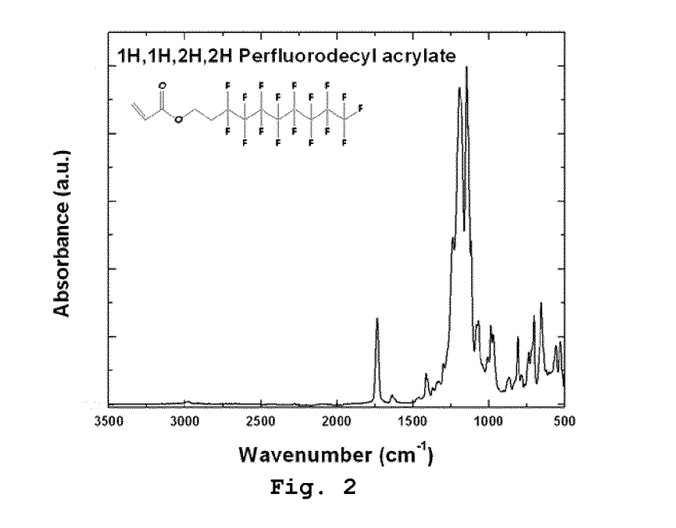
FIG. 2 represents a FT-IR spectrum of a PFDA monomer.
Figure 3:
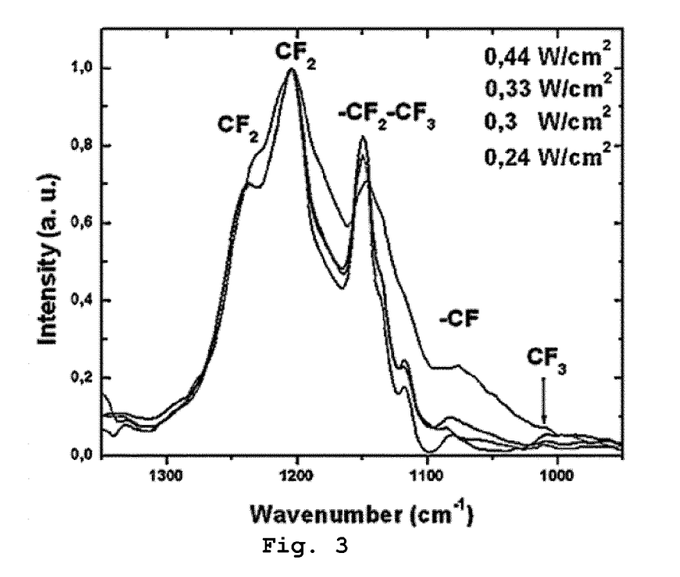
FIG. 3 represents FT-IR spectra of fluorocarbon plasma polymers obtained with different plasma power density (W/cm$^2$) conditions.

FTIR spectra (FIG. 2, FIG. 3, table 1) show the chemical functions of the PFDA monomer (FIG. 2) and the pp-PFDA coatings (FIG. 3) prepared under different plasma power conditions (P=120 W is considered as high fragmentation (W/F) and P=70 W as low fragmentation (W/F)). These two power conditions (120 W and 70 W) correspond to a power density of 0.2 and 0.12 W/cm$^2$, respectively.

TABLE 1

FT-IR absorption bands corresponding to different chemical groups present in the PFDA monomer and in plasma polymerized (pp-PFDA) coatings.

| Peak position (cm−1) | Assignment |
|---|---|
| 2850-2980 | C—H stretching in CH$_2$ group |
| 1736 | >C=O stretching of acrylate group |
| 1640 | C=C stretching |
| 1440-1480 | C—H bending in CH$_2$ group |
| 1330 | C—F stretching in CF$_2$—CF$_3$ groups and —COO group |
| 1246 | C—F stretching overlapped with CH$_2$ wagging |
| 1207 | CF$_2$ -asymmetric stretching |
| 1153 | CF$_2$ -symmetric stretching |
| 1115 | C—O stretching overlapped the C—F vibration mode |
| 1085 | CF |
| 1010 | CF$_3$ |
| 980 | C—H out of plane |
| 660 | Rocking CF$_2$ |
| 532 | wagging CF$_2$ |

Bands at 2855 cm$^{-1}$ and 2968 cm$^{-1}$ correspond to C—H stretching in CH$_2$ group. The broad band at 1743 cm$^{-1}$ assigned to the >C=O stretching from the acrylate groups, is still present on pp-PFDA spectrum (FIG. 3) as well as for the —C—O—C— groups at 1115 cm$^{-1}$. Moreover, compared to the monomer spectrum, the intensity of bands at 1640 cm$^{-1}$ from C=C bonds strongly decrease after plasma polymerization. The sharp peaks at 1246 cm$^{-1}$ and 1207 cm$^{-1}$ are assigned to the asymmetric and symmetric stretching of the CF$_2$ groups. The broad band at 1330 and 1153 cm$^{-1}$ attributed to the C—F stretching in the —CF$_2$—CF$_3$ end group. FTIR measurements indicate a low dissociation of carbonyl groups from the monomer even for higher power. Furthermore, it appears that power supply increases a complete disappearance of C=C groups indicating a cross-linking by these double bond. The presence of CF$_2$ and CF$_3$ groups highlights that the polymerization at atmospheric pressure of PFDA successfully retains the functional groups of the monomer. No change has been shown in the surface chemical composition of the plasma polymers coatings obtained in dynamic conditions.

X-Ray spectroscopy measurements are made on pp-PFDA coating according to plasma parameters. First of all, the survey XPS spectra of pp-PFDA deposited at atmospheric pressure shows the presence of C, O and F atoms and surprisingly do not reveal the presence of impurity such as nitrogen, which could be normally expected as the process is performed at atmospheric pressure. It seems that helium as plasma gas is acting as a barrier during the process avoiding any contamination by amino or hydroxyl groups.

Table 2 gathers the content of C, O and F present at the surface of the coating.

TABLE 2

Concentrations of elements, in percentage, from XPS survey spectra in pp-PFDA.

| | Elementary Analysis | | |
|---|---|---|---|
| | F | O | C |
| Theorical Monomer | 56.7 | 6.7 | 36.6 |
| Hard (W/F) | 64.8 | 8.8 | 26.4 |
| Low (W/F) | 61.5 | 5.6 | 32.9 |

Compared to the monomer theoretical value, the amount of Fluor is found to increase after plasma polymerization.

Figure 4:
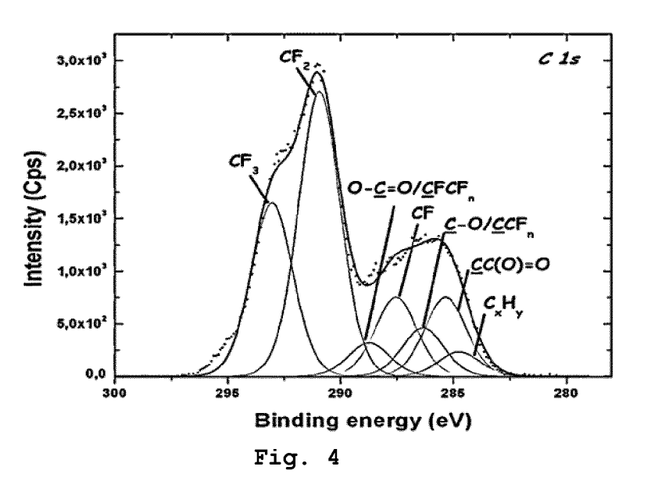
FIG. 4 represents a high resolution C1s XPS spectrum of a plasma polymer PFDA (pp-PFDA) coating prepared under soft fragmentation (W/F) conditions.
Figure 5:
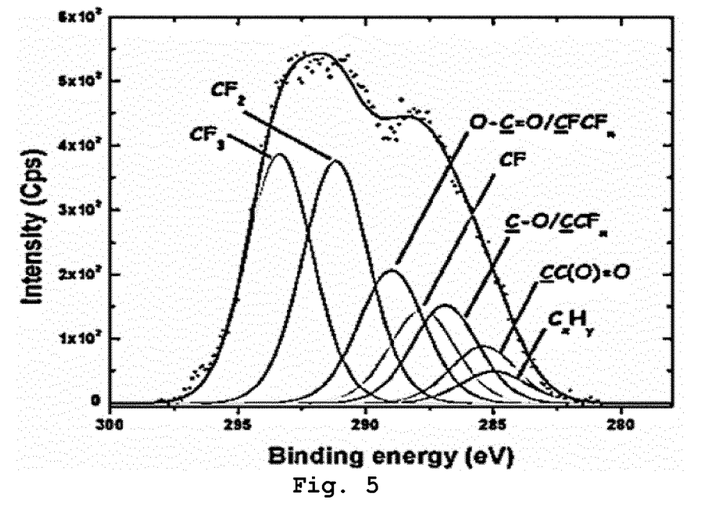
FIG. 5 represents a high resolution C1s XPS spectrum of a plasma polymer PFDA (pp-PFDA) coating prepared under high fragmentation (W/F) conditions.

High resolution measurements of XPS photoelectron peak of C1s represented on FIGS. 4 and 5 have been deconvoluted into seven species and give an overview of the surface chemical composition of the film.

Table 3 gathers the atomic percentages of carbon environments from C 1s spectra after fitting.

TABLE 3

Chemical species concentration, in percentage, obtained by XPS analyses (integration of High resolution C1s peak) for the pp-PFDA coatings obtained under a) soft fragmentation (low W/F) conditions and b) hard fragmentation (high W/F) conditions.

| | C 1s deconvolution | | | | | | | |
|---|---|---|---|---|---|---|---|---|
| Functional group | CF$_3$ | CF$_2$ | O—C=O/ CF—CF$_n$ | CF | CO/ CCFn | CC(O)=O | C$_x$H$_y$ | [F]/[C] |
| High W/F | 27.5 | 26.8 | 14.7 | 10.3 | 10.8 | 6.4 | 3.5 | 1.46 |
| Low W/F | 23.9 | 39.4 | 4.8 | 10.5 | 6.5 | 11.7 | 3.2 | 1.61 |

Deconvolution and integration of XPS peaks allow evaluating the experimental area percentages for the —CF$_2$— and —CF$_3$ functional groups and to determine the effect of plasma parameters on samples surface chemistry, especially to estimate the fluorine abundance at the surface through the [F]/[C] ratio obtained by the following equation:

$$\frac{[F]}{[C]} = \frac{3 \times CF\ 3\% + 2 \times CF\ 2\% + CF\ \%}{100}$$

FTIR and MALDI experiments (FIG. 3 and FIG. 6 respectively) are carried out to evaluate the molecular structure of the pp-PFDA polymer, the presence of PFDA oligomers and the perfluoro alkyl longer chains.

Figure 6:
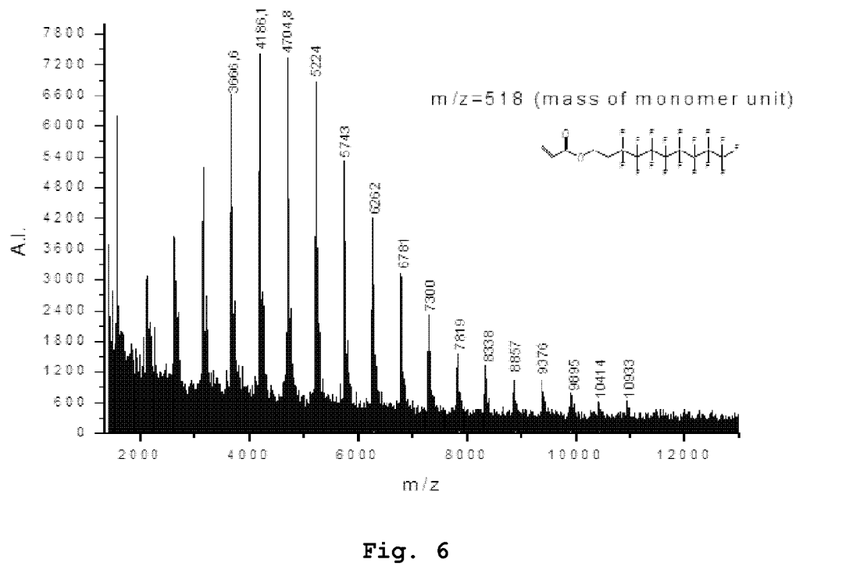
FIG. 6 represents a MALDI-TOF-MS mass spectrum of the soluble fraction in HFIP of a plasma polymer PFDA (pp-PFDA) coating.

The MALDI-TOF-MS mass spectrum of the HFIP soluble fraction of the pp-PFDA coating prepared under soft fragmentation conditions (low W/F) is represented in FIG. 6. This analysis displays series of peaks spaced by 518 Da, which corresponds to the PFDA monomer mass. These MS analyses provided a detection of m/z values up to 11000 Da suggesting that the plasma polymerization occurred in these conditions with a total of more than 20 monomers repetition.

Figure 8:
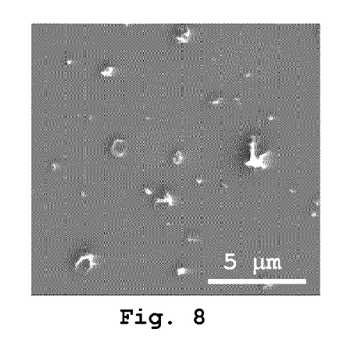
FIG. 8 represents a SEM picture of a plasma polymer PFDA (pp-PFDA) coating after 2 passes in dynamic deposition conditions corresponding to a thickness of 20 nm (Sa=10 nm).

Morphology and topography of pp-PFDA can easily be tuned by adapting the deposition parameters. However, by adapting the deposition conditions, i.e. for optimized precursor flow rate and the deposition power to obtain the maximum [F]/[C] ratio, plasma polymer thin film growth has been described by SEM images (FIG. 8).

In the static deposition conditions (FIG. 7), SEM pictures of the coating show a porous microstructure with a large number of heterogeneities.

Figure 9:
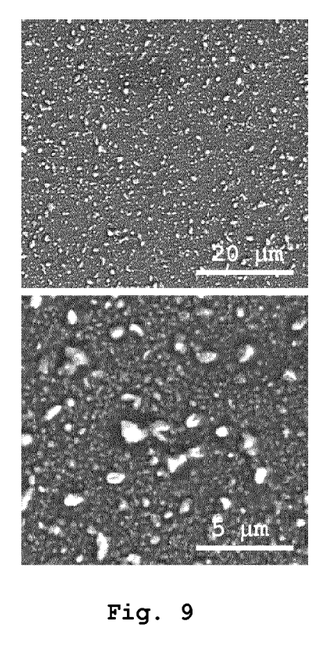
FIG. 9 represents SEM pictures of a plasma polymer PFDA (pp-PFDA) coating after 50 passes in dynamic deposition conditions corresponding to a thickness of 200 nm (Sa>100 nm).

In the dynamic deposition conditions, the deposition time is controlled by the number of passes above the substrate at a constant speed. FIGS. 8 and 9 show a top view of the of pp-PFDA coating at different deposition passes under optimized deposition conditions.

After two passes (FIG. 8), i.e. one backward movement and one forward movement of the top electrode, it can be seen that the substrate is already covered with a coating with an island-like growth with good covering properties. This is shown by XPS measurements without detecting the substrate elements anymore.

Figure 7:
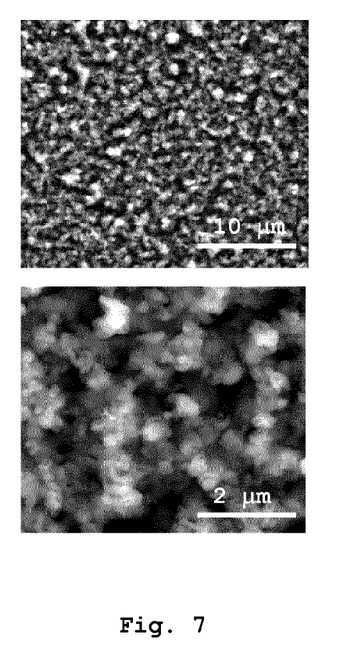
FIG. 7 represents SEM pictures of a plasma polymer PFDA (pp-PFDA) coating after 2 minutes in static deposition conditions corresponding to an average thickness of 200 nm.

After 50 passes (FIG. 9), a 200 nm thick pp-PFDA coating is obtained. Its roughness can be described as small nano-sized globular structures, with less heterogeneities than in the static deposition conditions (FIG. 7).

Figure 10:
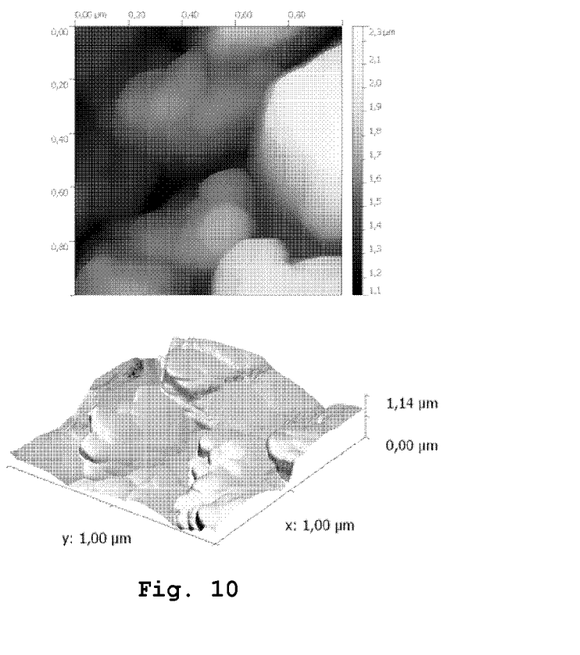
FIG. 10 represents AFM images (high magnification) of a plasma polymer PFDA (pp-PFDA) coating prepared under soft fragmentation conditions (low W/F) after 2 minutes corresponding to a thickness of 200 nm in static deposition conditions.

Topography investigated by AFM measurements (FIG. 10 to FIG. 12) confirm the structural differences of nano-sized globular structures obtained during the plasma polymerization (Sa=124, 2 nm) in the dynamic deposition conditions (FIGS. 11 and 12) in comparison to the ones obtained in the static deposition conditions (FIG. 10).

Figure 11:
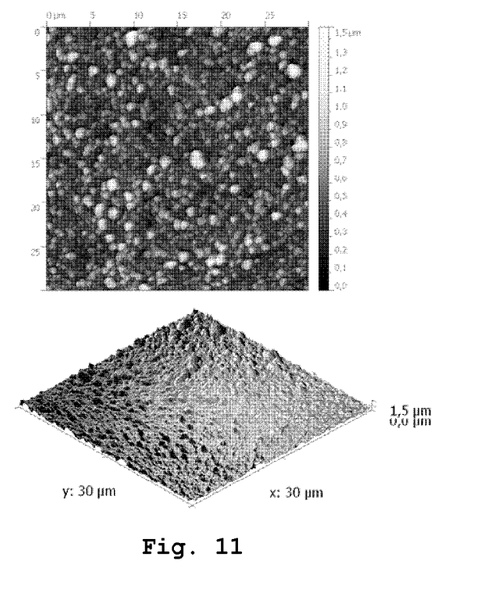
FIG. 11 represents AFM images of a plasma polymer PFDA (pp-PFDA) coating prepared under soft fragmentation conditions (low W/F) after 50 passes corresponding to a thickness of 200 nm in dynamic deposition conditions.
Figure 12:
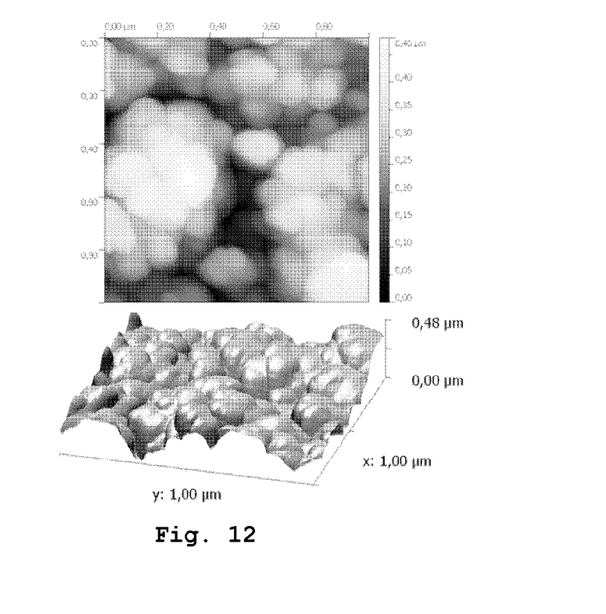
FIG. 12 represents AFM images (high magnification) of a plasma polymer PFDA (pp-PFDA) coating prepared under soft fragmentation conditions (low W/F) after 50 passes corresponding to a thickness of 200 nm in dynamic deposition conditions.

The coating obtained in the dynamic deposition conditions shows structures being more homogeneous and regular than the ones of the coating obtained in the static deposition conditions. The coating, obtained in the static deposition conditions, presents a large number of structural defects, agglomerates and a more heterogeneous topography.

The coating morphology, obtained in either the dynamic or static deposition conditions, is attributed to the soft fragmentation regime. Indeed, the fragmentation of the monomer followed by the polymerization occurs in competition with the etching/ablation process. By decreasing the plasma power, the competitive etching/ablation process is considerably reduced to promote the plasma polymerization and the island growth. In contrary, with more energetic conditions, smoother surface morphologies have been obtained (Sa=15.4 nm) due to the high etching/ablation effect during the plasma deposition leading to a decrease of the superamphiphobic properties (static contact angle value of 122° and 69° for water and hexadecane respectively). The difference observed in the surface morphology/topography of pp-PFDA coatings is thought to be attributed to the different growth processes involved as function of the plasma conditions.

The superamphiphobic properties have been investigated using contact angle measurement by the sessile drop method with water and hexadecane according to advancing/receding method to evaluate the water contact angle hysteresis (WCAH).

Figure 13:
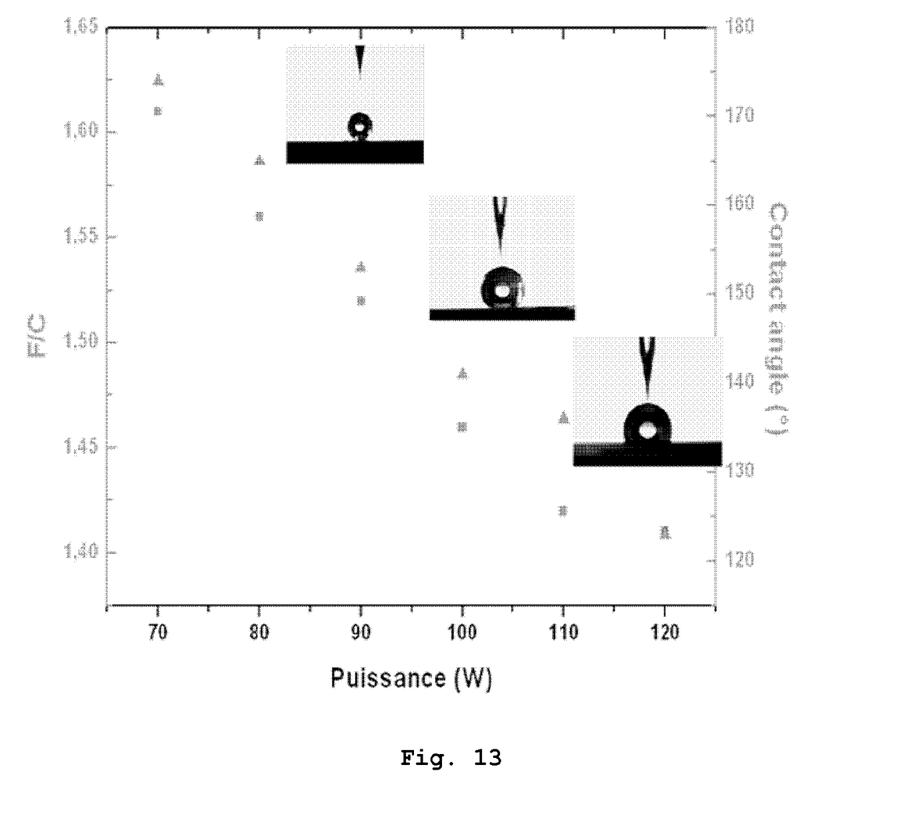
FIG. 13 represents the water contact angle values according to the sessile drop test and [F]/[C] ratio as a function of the plasma power.

FIG. 13 show a representation of the sessile drop method contact angle values obtained with water as function of the plasma deposition power. As expected, a strong relation has been evidenced between the [F]/[C] ratio and the water wetting properties, with a CA maximum value of 174.0±0.7° for a plasma power of 70 W, which corresponds to a maximum [F]/[C] ratio of 1.61 and a maximum roughness (Sa) of 124.2 nm. Sessile drop method contact angle performed with hexadecane, to evaluate the oleophobicity (not represented here), also evidenced a CA maximum value of 154.0±1.4° for plasma power of 70 W. The same tendency was observed with hexadecane than those obtained with water according to the plasma power.

In static deposition conditions (data not shown), water static contact angle obtained is 155.5±2.9°, with a WCAH value of 8.9°±2.3, and of 139° for hexadecane, this is due to the more heterogeneous topography obtained in the static mode with higher defects density and a general porous microstructure.

Figure 14:
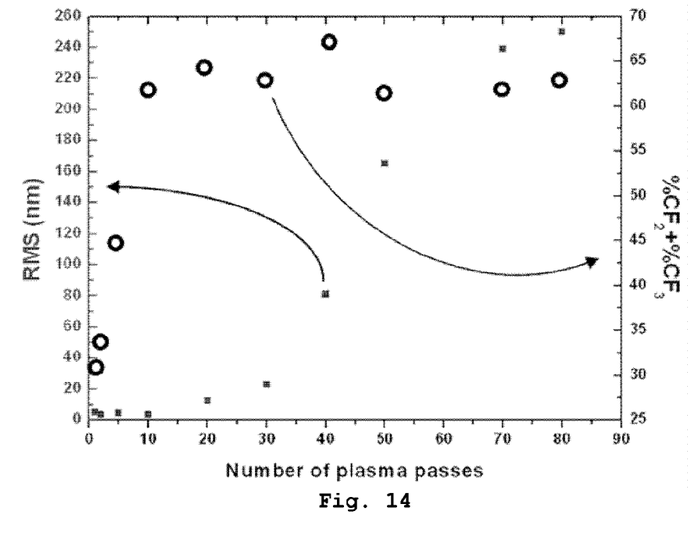
FIG. 14 represents the roughness (Root Mean Square) and the fluorine content on the samples surface according to the number of passes.
Figure 15:
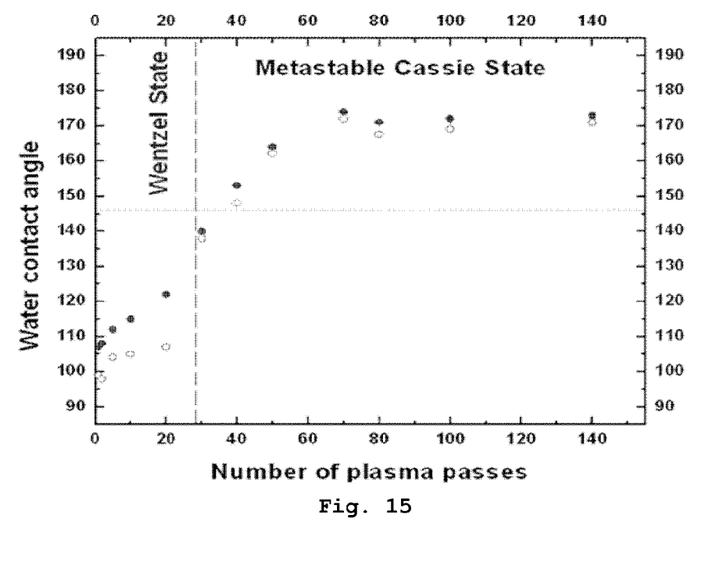
FIG. 15 represents the contact angle values according to the number of passes.

RMS roughness and fluorine content according to number of passes are evaluated in FIG. 14. Water contact angle is evaluated in FIG. 15.

Superamphiphobic surfaces, i.e. coatings having both water and oil repellent behaviour, are obtained with at least two passes. To obtain coatings having higher contact, the number of passes should increase. To get an angle of 150° for water and oil for example, the number of passes should be at least of 40 passes, preferably between 40 and 80 passes, more preferably between 50 and 70 passes.

Figure 16:
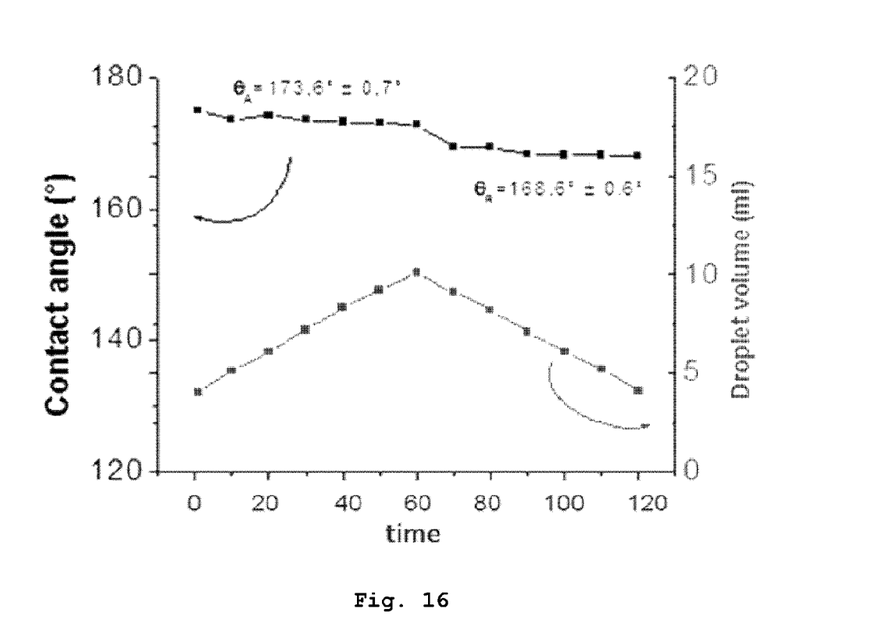
FIG. 16 represents the water contact angle according to the advancing/receding mode measured on a plasma polymer PFDA (pp-PFDA) coating prepared under soft fragmentation conditions (low W/F).
Figure 17:
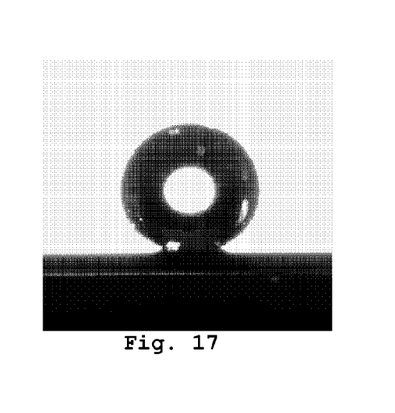
FIG. 17 represents the maximum water contact angle of 174.8° obtained by the sessile drop method and measured on a plasma polymer PFDA (pp-PFDA) coating obtained under optimized soft fragmentation condition and in dynamic deposition conditions.

Water Contact Angle according to advancing/receding mode is evaluated and represented in FIG. 16 for the dynamic deposition conditions. An average contact angle value of 173.6°±0.7° is obtained during advancing ($\theta_A$) and of 168.6°±0.6 during receding step ($\theta_R$). A WCAH value of 5.0°±0.9° (calculated by the difference between the average value obtained during advancing step and the average value obtained during the receding step) has been evaluated, which corresponds to a Cassie regime in dynamic deposition conditions. Low WCAH value observed in our case is mainly associated to the presence of the highly regular topography.

LIST OF REFERENCE SIGNS

1 plasma reactor
2 first electrode
3 second electrode
4 insulating dielectric barrier
5 discharge space (process space)
6 gas flow
7 alternating current power means

The invention claimed is:

1. A plasma polymerization method for producing a superamphiphobic coating on a substrate, said method comprising the steps of:
   a) providing a substrate,
   b) generating a plasma in a treatment space under atmospheric pressure, using a dielectric barrier discharge, by supplying a plasma gas between at least a first and a second electrode connected to alternating current (AC) power means, said electrodes defining said treatment space,
   c) introducing into said plasma a coating forming material in liquid or gaseous form, the coating forming material being selected from the group consisting of fluoro-acrylate monomers, fluoro-alkyl acrylate monomers, fluoro-methacrylate monomers, fluoro-alkyl methacrylate monomers, fluroro-silane, monomers or a combination thereof,
   d) depositing said coating by plasma polymerization of said coating forming material by exposing at least a part of the surface of said substrate to said plasma comprising said coating forming material in multiple successive passes within said treatment space by moving said substrate and/or said at least first and/or second electrode,
   wherein the generation of the plasma and said introduction of said coating forming material into said plasma are carried out without stopping between successive passes,
   wherein the number of said multiple successive passes amounting to 40 at least, and
   wherein the plasma polymerization of said coating forming material results in formation of nano-sized globular structures on the exposed part of the surface of the substrate.

2. The method according to claim 1, wherein the movement of the at least first and second electrodes and/or the substrate is a translational or a rotational movement.

3. The method according to claim 1, wherein the coating forming material comprises a monomer, or monomers, having the formula:

wherein $R_1$, $R_2$, independently of one another are hydrogen, fluorine, a fluoro-alkyl ($C_1$-$C_4$) or $CF_3$, n is comprised between 3 to 30, $R_3$, $R_4$, independently of one another and independently of $R_1$ and $R_2$, are hydrogen, an alkyl($C_1$-$C_4$), an hydroxyl, m is 1 or 2 or 3, X is O—CO—$CR_5$=$CHR_6$ wherein $R_5$ and $R_6$, independently of $R_1$, $R_2$, $R_3$ and $R_4$, are hydrogen or a methyl group, or X is —Y—Si—$(R_7)_3$, wherein Y is oxygen or nothing, and $R_7$, independently of $R_1$, $R_2$, $R_3$, and $R_4$, is an alkoxy group.

4. The method according to claim 1, wherein the coating forming material is introduced into the plasma gas at a mass flow comprised between 0.001 and 10 g per liter of plasma gas.

5. The method according to claim 1, wherein the coating is deposited over the substrate surface at a deposition rate comprised between 10 and 500 nm/min.

6. The method according to claim 1, wherein the plasma is generated with a power density comprised between 0.05 and 10 W·cm$^{-2}$.

7. A plasma polymerization method for producing a superamphiphobic coating on a substrate, said method comprising the steps of:
a) providing a substrate,
b) generating a plasma in a treatment space under atmospheric pressure, using a dielectric barrier discharge, by supplying a plasma gas between at least a first and a second electrode connected to alternating current (AC) power means, said electrodes defining said treatment space,
c) introducing into said plasma a coating forming material in liquid or gaseous form, the coating forming material being selected from the group consisting of fluoro-acrylate monomers, fluoro-alkyl acylate monomers, fluoro-methacrylate monomers, fluoro-alkyl methacrylate monomers, fluoro-silane, monomers or a combination thereof,
d) depositing said coating by plasma polymerization of said coating forming material by exposing at least a part of the surface of said substrate to said plasma comprising said coating forming material in multiple successive passes within said treatment space by moving said substrate and/or said at least first and/or second electrode,
wherein the generation of the plasma and said introduction of said coating forming material into said plasma are carried out without stopping between successive passes, the number of said multiple successive passes amounting to 40 at least, and
wherein the superamphiphobic coating has a contact angle of at least 150° for water and 130° for hexadecane and a roughness (Sa) comprised between 50 nm and 300 nm.

8. The plasma polymerization method as claimed in claim 1, wherein, during plasma polymerization of said coating forming material, the fluoro-acrylate monomers are fragmented before undergoing polymerization.

9. The plasma polymerization method as claimed in claim 1, wherein plasma polymerization of said coating forming material occurs concurrently with a competing etching/ablation process.

10. The plasma polymerization method as claimed in claim 9, wherein plasma power is adjusted to promote one of plasma-polymerization and etching/ablation to the detriment of the other.

11. A plasma polymerization method, comprising producing a superamphiphobic coating on a substrate, said production of said superamphiphobic coating including:
carrying out a first pass of at least a part of the surface of said substrate across a plasma comprising a coating forming material in gaseous, vaporized, nebulized, atomized or aerosol form,
carrying out a second pass of at least said part of the surface of said substrate across said plasma by reversing the movement of said first pass across the plasma or by repeating the movement of said first pass across the plasma,
repeating said first and second passes multiple times,
wherein during each pass said coating forming material deposits by plasma polymerization on at least said part of the surface of said substrate,
wherein said plasma comprising said coating forming material is generated under atmospheric pressure, using a dielectric barrier discharge, by supplying a plasma gas between at least a first and a second electrode connected to alternating current (AC) and by introduction of said coating forming material in gaseous, vaporized, nebulized, atomized or aerosol form into said plasma,
wherein said plasma comprising said coating forming material is generated continuously during and in-between said first and second passes and the repetitions thereof, and
wherein the coating forming material deposits in the form of nano-sized globular structures.

12. The plasma polymerization method as claimed in claim 11, wherein parameters of the plasma generation and of the introduction of coating forming material into the plasma are maintained substantially constant during and in-between said first and second passes and the repetitions thereof.

13. The plasma polymerization method as claimed in claim 11, wherein the production of said superamphiphobic coating includes no curing subsequent to the multiple repetitions of said first and second passes.

14. The method according to claim 11, wherein the coating forming material comprises one or more monomer species, having the formula:

wherein $R_1$, $R_2$, independently of one another are hydrogen, fluorine, a fluoro-alkyl ($C_1$-$C_4$) or $CF_3$, n is comprised between 3 to 30, $R_3$, $R_4$, independently of one another and independently of $R_1$ and $R_2$, are hydrogen, an alkyl($C_1$-$C_4$), an hydroxyl, m is 1 or 2 or 3, X is O—CO—$CR_5$=$CHR_6$ wherein $R_5$ and $R_6$, independently of $R_1$, $R_2$, $R_3$ and $R_4$, are hydrogen or a methyl group, or X is —Y—Si—$(R_7)_3$, wherein Y is oxygen or nothing, and $R_7$, independently of $R_1$, $R_2$, $R_3$, and $R_4$, is an alkoxy group.

15. The plasma polymerization method as claimed in claim 14, wherein, during plasma polymerization of said coating forming material, the monomers are fragmented before undergoing polymerization.

16. The plasma polymerization method as claimed in claim 11, wherein plasma polymerization of said coating forming material occurs concurrently with a competing etching/ablation process and wherein plasma power is adjusted to promote one of plasma polymerization and etching/ablation to the detriment of the other.

17. The method according to claim 7, wherein the movement of the at least first and second electrodes and/or the substrate is a translational or a rotational movement.

18. The method according to claim 7, wherein the coating forming material comprises a monomer, or monomers, having the formula:

wherein $R_1$, $R_2$, independently of one another are hydrogen, fluorine, a fluoro-alkyl ($C_1$-$C_4$) or $CF_3$, n is comprised between 3 and 30, $R_3$, $R_4$, independently of one another and independently of $R_1$ and $R_2$, are hydrogen, an alkyl ($C_1$-$C_4$), an hydroxyl, m is 1 or 2 or 3, X is O—CO—$CR_5$=$CHR_6$ wherein $R_5$ and $R_6$, independently of $R_1$, $R_2$, $R_3$, and $R_4$, are hydrogen or a methyl group, or X is —Y—Si—$(R_7)_3$, wherein Y is oxygen or nothing, and $R_7$, independently of $R_1$, $R_2$, $R_3$, and $R_4$, is an alkoxy group.

19. The method according to claim 7, wherein the coating forming material is introduced into the plasma gas at a mass flow comprised between 0.001 and 10 g per liter of plasma gas.

20. The method according to claim 7, wherein the coating is deposited over the substrate surface at a deposition rate comprised between 10 and 500 nm/min.

\* \* \* \* \*